US008089993B2

(12) United States Patent
Wei et al.

(10) Patent No.: US 8,089,993 B2
(45) Date of Patent: Jan. 3, 2012

(54) SLICEABLE ROUTER WITH PACKET OVER OPTICAL OFDM TRANSMISSION

(75) Inventors: Wei Wei, Princeton, NJ (US); Ting Wang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 155 days.

(21) Appl. No.: 12/207,201

(22) Filed: Sep. 9, 2008

(65) Prior Publication Data

US 2010/0061470 A1    Mar. 11, 2010

(51) Int. Cl.
*H04J 3/04* (2006.01)

(52) U.S. Cl. ........ 370/536; 370/319; 370/344; 370/348; 370/437; 370/442; 370/533; 370/537; 370/539; 398/115

(58) Field of Classification Search .................... None
See application file for complete search history.

(56) References Cited

U.S. PATENT DOCUMENTS

| | | | |
|---|---|---|---|
| 7,446,774 B1 * | 11/2008 | MacInnis et al. ............. 345/519 |
| 7,558,310 B1 * | 7/2009 | von der Embse ............. 375/130 |
| 7,630,636 B1 * | 12/2009 | Feuer et al. .................... 398/51 |
| 2002/0018269 A1 * | 2/2002 | Chaudhuri et al. ............ 359/165 |
| 2003/0131133 A1 * | 7/2003 | Nyu et al. ..................... 709/245 |
| 2003/0152162 A1 * | 8/2003 | Kojima .......................... 375/295 |
| 2005/0169576 A1 * | 8/2005 | Capewell ....................... 385/21 |
| 2007/0073447 A1 * | 3/2007 | Crosby et al. ................. 700/299 |
| 2007/0130295 A1 * | 6/2007 | Rastogi et al. ................ 709/220 |
| 2007/0201464 A1 * | 8/2007 | Lv et al. ........................ 370/389 |
| 2008/0049709 A1 * | 2/2008 | Pan et al. ....................... 370/344 |
| 2008/0267630 A1 * | 10/2008 | Qian et al. ....................... 398/89 |
| 2009/0034965 A1 * | 2/2009 | Look ............................... 398/19 |
| 2009/0168776 A1 * | 7/2009 | Baum et al. .................... 370/390 |
| 2009/0220239 A1 * | 9/2009 | Armstrong et al. ............ 398/81 |
| 2009/0225675 A1 * | 9/2009 | Baum et al. .................... 370/252 |
| 2009/0231990 A1 * | 9/2009 | Lee et al. ....................... 370/207 |
| 2009/0257343 A1 * | 10/2009 | Qi et al. ......................... 370/208 |
| 2010/0008287 A1 * | 1/2010 | Lin et al. ....................... 370/315 |

OTHER PUBLICATIONS

W. Wei, Lei Zong, Dayou Qian, "Wavelength-based Sub-carrier Multiplexing and Grooming for Optical Networks Bandwidth Virtualization," *In Proc. of OFC '08*, PDP35, 2008, San Diego, CA, USA.

A. Bocoi, M. Schuster, F. Rambach, D. A. Schupke, C.-A. Bunge, and B. Spinnler, "Cost Comparison of Networks Using Traditional 10 and 40 Gb/s Transponders Versus OFDM Transponders," *In Proc. of OFC '08*, OThB4, 2008, San Diego, CA, USA.

S. Melle, R. Dodd, S. Grubb, C. Liou, V. Vusirikala, D. Welch, "Bandwidth virtualization enables long-haul WDM transport of 40Gb/s and 100Gb/s services," *IEEE Communications Magazine*, vol. 46, No. 2, pp. 22-29, Feb. 2008.

N. McKeown, T. Anderson, H. Balakrishnan, G. Parulkar, L. Peterson, J. Rexford, S. Shenker, and J. Turn: "OpenFlow: Enabling Innovation in Campus Networks," *ACM Computer Communication Review*, vol. 38, No. 2, pp. 69-74, 2008.

(Continued)

*Primary Examiner* — Robert Scheibel
*Assistant Examiner* — Ajay Cattungal
(74) *Attorney, Agent, or Firm* — Bao Tran; Joseph Kolodka

(57) ABSTRACT

A sliceable router includes a forwarding engine; a routing engine coupled to the forwarding engine; multiple virtual packet interfaces coupled to the forwarding engine, wherein the interfaces shares an optical orthogonal frequency-division multiple accesses (OFDMA)-based programmable transceiver for interface virtualization; and one or more physical packet interfaces coupled to the forwarding engine.

21 Claims, 5 Drawing Sheets

OTHER PUBLICATIONS

A. Bavier, N. Feamster, M. Huang, L. Peterson, and J. Rexford, "In VINI veritas: Realistic and controlled network experimentation," *In Proc. of ACM SIGCOMM*, pp. 3-14, 2006, Pisa, Italy.

J. Tuner, et al., "Superchaging PlanetLab-A High Performance, Multi-Application, Overlay Network Platform," *In Proc. of SIGCOMM '07*, Kyoto Japan, 2007.

A.T. Campbell, H.G. De Meer, M.E. Kounavis, K. Miki, J. Vicente, D. Villela, "A survey of programmable networks," *ACM SIGCOM Comput. Commun. Rev.*, vol. 29, No. 2, pp. 7-23, Apr. 1999.

I. B. Djordjevic, B. Vasic, "Orthogonal frequency division multiplexing for high-speed optical transmission," OSA *Opt. Express*, vol. 14, No. 9, pp. 3767-3775, May 2006.

H. Zhang, "Service Disciplines for Guaranteed Performance Service in Packet-Switching Networks," *Proceedings of IEEE*, vol. 83, No. 10, pp. 1374-1396, 1995.

Bill.St.Arnaud, "CA*net 4 Research Program Update—UCLP Roadmap for creating User Controlled and Architected Networks using Service Oriented Architecture," Canarie. Inc., 2006.

\* cited by examiner

SLICEABLE ROUTER WITH PACKET OVER OPTICAL OFDM TRANSMISSION

This application relates to sliceable routers and their transmission interfaces.

BACKGROUND

The Internet has become ossified due to its strong support of numerous activities of our society and the fact that it was not defined with the current vision of a business and societal infrastructure. For example, despite international support and strong technical motivation to migrate, IPv6 has not been widely deployed yet. The reason is that the basic concept of the Internet as an end-to-end packet delivery service has made its middle layer, networking services through TCP/IP, untouchable. To test any disruptive enhancements to security, routing flexibility and reliability, and robust quality of service guarantees in coming years, an Internet environment is needed where networking environments offering differing strengths can coexist on a permanent basis.

The Global Environment for Networking Innovation (GENI) is a US national shared experimental facility for future Internet research. One application-specific agile virtual network (namely slice) enables user defined experiment to run on GENI. In each slice, the virtual topology consisted of multiple virtual links (in contrast to physical links in GENI). Each virtual link not only provides connectivity (in addition to delay or packet loss ratio or even protection constraints), but also requires guaranteed bandwidth (arbitrary bandwidth granularity) for highly fidelity experiments. Due to multiple experiments running on one physical GENI substrate simultaneously, all resources including router bandwidth, processing computing cycles, and storage capacity should be sliceable.

In GENI, the routers play key roles for bandwidth virtualization, forwarding user packets, and computing routes. Thus, the problem of router bandwidth (or interface) virtualization for providing various kinds of virtual links is becoming a basic problem in GENI. The requirement of virtual link should be programmable, reconfigurable, and bandwidth guaranteed.

A conventional router usually provides several types of transmission pipe, e.g., Packets over SONET/SDH (POS), Gigabit Ethernet or 10 Gigabit Ethernet (GE/10GE) optical interfaces, which are mainly based on TDM/TDMA. Currently, there are already several applied methods for providing virtual interfaces or virtual links in GENI, most of them are based on software tunnels (only providing connectivity, no bandwidth guaranteed), including:

Lightpath (Optical Wavelength Path)
TDM circuit (SDH/SONET/MSTP, e.g., OC-3/STS-1)
ATM VC/VP
Ethernet VLAN tunnel
MPLS labeled switched path (LSP)
IP tunnel (e.g., GRE)
UDP tunnel The above conventional solutions are based on TDM/TDMA, which means all slices share the bandwidth resources in time domain. Generally speaking, the time-domain sharing solutions for bandwidth virtualization are rigid, complicated (e.g., scheduling), and inapplicable to highly bursty applications.

SUMMARY

A sliceable router includes a forwarding engine; a routing engine coupled to the forwarding engine; multiple virtual packet interfaces coupled to the forwarding engine, wherein the virtual interfaces share an optical orthogonal frequency-division multiple access (OFDMA)-based programmable transceiver for interface virtualization; and one or more physical packet interfaces coupled to the forwarding engine.

Implementations of the above aspect may include one or more of the following. The virtual packet interface can use a router-packet over optical OFDMA transmission technique. The virtual packet interface can support M virtual interfaces with N sub-carriers in one optical OFDMA physical link. A packet over optical OFDMA interface transmitter can be used. The sliceable router can include a plurality of virtual interfaces; a virtual link controller coupled to the virtual interfaces; a plurality of encoders coupled to the virtual link controller, each encoder coupled to a sub-carrier mapping unit; a time to frequency domain converter coupled to the sub-carrier mapping unit; a cyclic prefix unit coupled to the time to frequency domain converter to provide symbol gap; and an optical transmitter coupled to the cyclic prefix unit. The encoder can be a Forward Error Correction (FEC) encoder. The sub-carrier mapping unit can be a quadrature phase-shift keying (QPSK) mapping unit. The optical transmitter can be a parallel to serial converter to convert parallel data into serial data; a digital to analog converter (DAC) coupled to the parallel to serial converter; and an optical modulator coupled to the DAC. A packet over optical OFDMA interface receiver can be used with the transmitter. The router can also include an optical receiver to receive data packets; a frequency to time domain converter coupled to the optical receiver; a sub-carrier mapping unit coupled to the frequency to time domain converter; a plurality of demodulators coupled to the sub-carrier mapping unit, each demodulator coupled to a decoder; a virtual link controller coupled to the decoders; and a plurality of virtual interfaces coupled to the virtual link controller. The optical receiver can include a receiver coupled to an OFDMA link; an analog to digital converter coupled to the receiver; and serial to parallel converter to convert serial data into parallel data. The optical OFDMA-based programmable transceiver can use an adaptive method in the link level to support multiple packet encapsulations. The packets include IP as well as non-IP packets. The packets can be jumbo packets. An adaptive mapping structure of virtual interfaces to sub-carriers can be used for packet over optical OFDMA transmission interface. Each entry can be maintained locally by the sliceable router. A virtual interface index can provide the virtual interface identification and the associated FIFO identification. Each virtual interface can be configured as an IP address with a mask. The packet over optical OFDMA transceiver can be combined with a wavelength switching unit for providing multi-granularity dynamic circuit switching.

Advantages of the preferred embodiment may include one or more of the following. The system supports the flexibility of optical OFDMA interfaces supporting multiple parallel virtual links. The system enables dynamic (real-time) bandwidth resource sharing and partition for slice requests. Other advantages include a low control overhead, higher efficient packet transmission scheme, fine-grained bandwidth virtualization and natural slice isolation method.

DESCRIPTION

Figure 1:
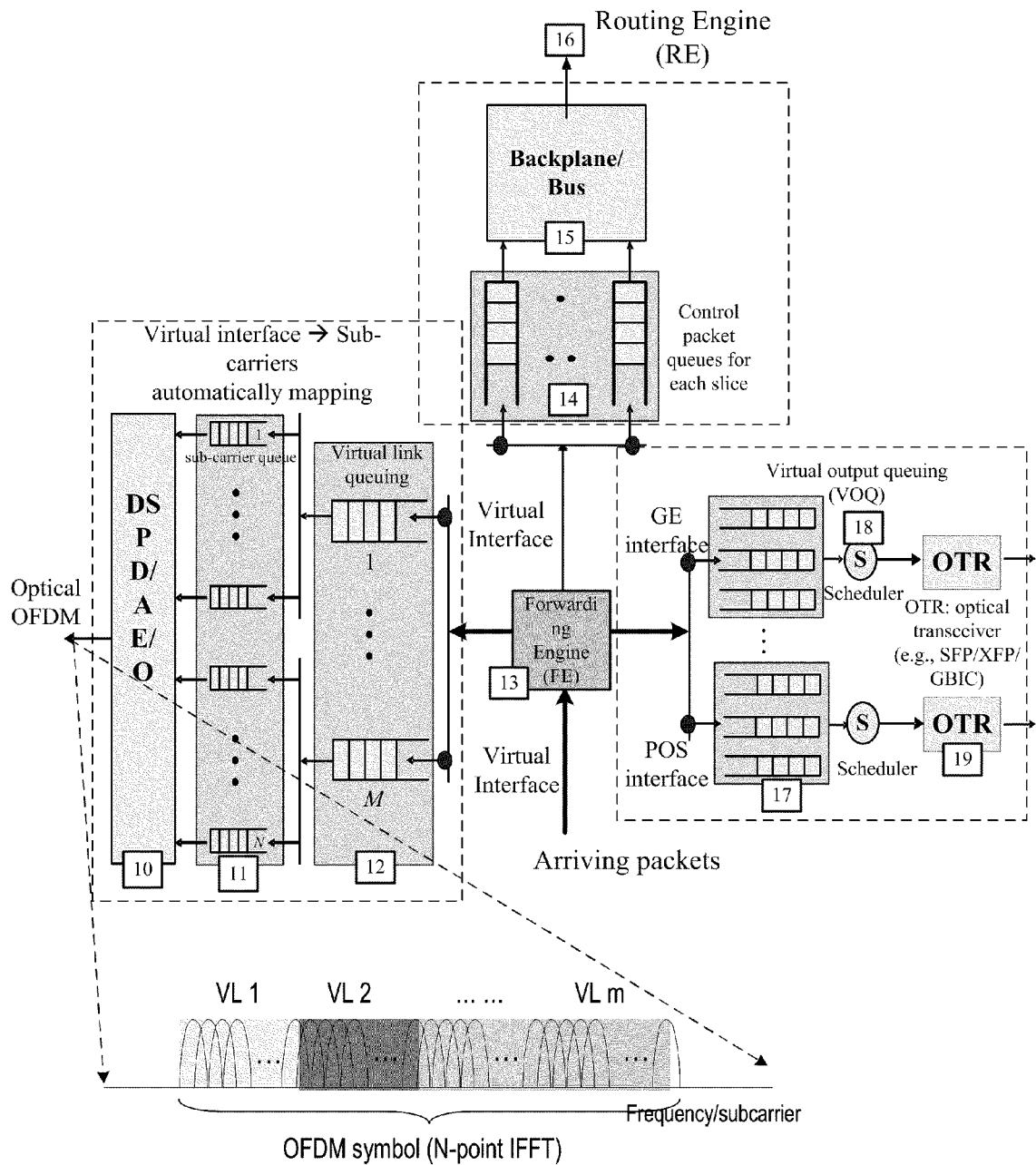
FIG. 1 shows a sliceable router structure utilizing optical OFDMA interface.

FIG. 1 shows a router (called sliceable router) structure utilizing optical OFDMA-based programmable mechanisms for bandwidth management. The router provides bandwidth virtualization for routers by adopting a new optical transmission interface, i.e., packet over optical OFDMA transmission interface that is not only a modulation format, but also a multiplexing technique, dividing the transmission bandwidth into N (e.g., 256) parallel sub-channels. Each optical OFDMA physical link (e.g., data rate 10 Gb/s) supports parallel multiple virtual links (bandwidth programmable). Each virtual interface of router with different IP address/mask works just like one physical transmission pipe such as OC-192c packet over SONET and Gigabit Ethernet (POS/GE). A forwarding engine (FE) of router is integrated with optical OFDMA transmission to provide a transmission-aware FE. The optical OFDMA interface of router transmits the packets through a number of orthogonal sub-carriers, each carrying a relatively low data rate, so that the data period could be enlarged and the optical multi-path interference (i.e., CD/PMD) is reduced. It is a special case of multi-carrier transmission interface whereas conventional routers usually use statistics-based TDM/TDMA transmission interfaces (e.g., POS/GE interfaces).

FIG. 1 shows a sliceable router structure utilizing optical OFDMA interface. To avoid redundancy, only one transmission path is shown, and the other direction is simply the reverse of the transmission path. The sliceable router has main four parts. In one part, a virtual interface includes a virtual link block 12 with M queues that receive data from a forwarding engine 13. The forwarding engine 13 receives incoming data packets. The outputs of the virtual link queues 12 are provided to N sub-carrier queue block 11 which in turn are provided to a digital signal processing block 10 for handling optical OFDM functions. The virtual interface represents the optical OFDMA interfaces that support multiple virtual links (VL) in one physical links, each VL is just like conventional GE or POS router interfaces in blocks 17, 18 and 19. The FE 13 can send data to the GE interface queue which is provided to a scheduler block 18 and then sent to the transceiver (e.g., GBIC) unit. Alternatively, the FE 13 can send data to the POS interface queue 17, which sends the data to the scheduler block 18 and then to the transceiver (e.g., SFP) block 19. The FE 13 can also send data to control packet queues 14 for each slice. The queues 14 sends data over a backplane bus 15 to a routing engine 16. Blocks 14, 15 and 16 are responsible for each slice routing protocols and forwarding information database (FIB) computing, the basic functionality of the routing engine (RE) 16 is similar with those conventional routers except that the RE needs to take the virtual interfaces of the virtual link queue 12 into account. In one embodiment, the FE 13 is based on the principle of longest-prefix match (LPM), which treats conventional interfaces of blocks 17, 18 and 19, itself interface (routing protocols) of block 14, and multiple virtual interfaces of block 12 in one physical optical OFDMA port in a consistent way.

In the system of FIG. 1, each OFDMA link/port carries multiple virtual links (e.g., M channels of subset of sub-carriers). The FE 13 maintains separate FIFO for each virtual link to store the packets, which maybe IP packets or not. The FIB keeps each entry for each virtual interface. The FE 13 is integrated with the optical OFDMA transmission, i.e., transmission-aware FE.

The packet over optical OFDMA interfaces is a high-speed router transmission technique (when compared with PoS/GE router interfaces). One sub-carrier is similar with one time slot, but it is more flexible than the time slot. For example, in optical OFDMA interface, different sub-carriers can adaptively change their modulation/coding format to deal with physical layer impairments, thus each subset of sub-carrier supports different data rates (vs. the same rate for all time slots due to the need for fast clock recovery).

The optical OFDMA interface shown in FIG. 1 is different from conventional PoS/GE/10GE packet interfaces in a router, which has different link data frame format, PHY frame format, waveform/modulation format for transmission.

The system of FIG. 1 provides flexibility due to protocol independence and service transparency: in essence, subsets of sub-carriers, like transparent pipes, are ideal for bandwidth resource sharing and isolation (virtualization), which can emulate any kind of virtual links at any granularity, the forwarded packets could be arbitrary format. The system provides a 100% bandwidth guarantee: when compared to statistics, or queuing based approaches including the most popular IP/MPLS/Ethernet tunnel connections, using the optical OFDMA can provide 100% bandwidth guarantee and 100% isolation among different slices, and potentially more flexible bandwidth allocations.

In one embodiment, the system achieves low cost and high performance due to cross-layer design in router/optics by taking advantages of FPGA-based digital signal processing (DSP). The system integrates the optical transmission with routing/forwarding functionalities in one layer, and natively supports parallel services without rigid clock and synchronization issues. It is the ideal solution for the overlay experimental networks when comparing with the traditional IP router with rigid TDM transmission solution.

Figure 2:
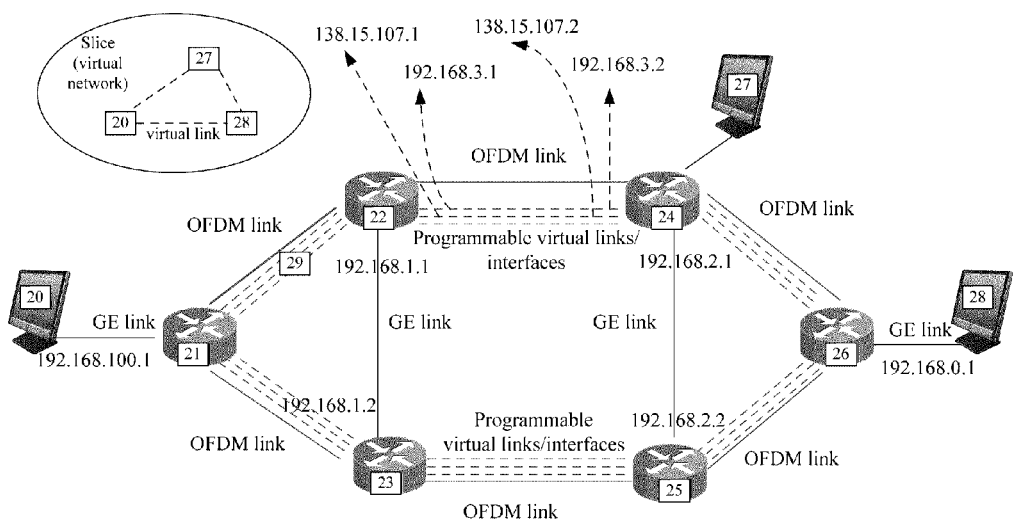
FIG. 2 shows an exemplary 6-node sliceable router network.
Figure 6:
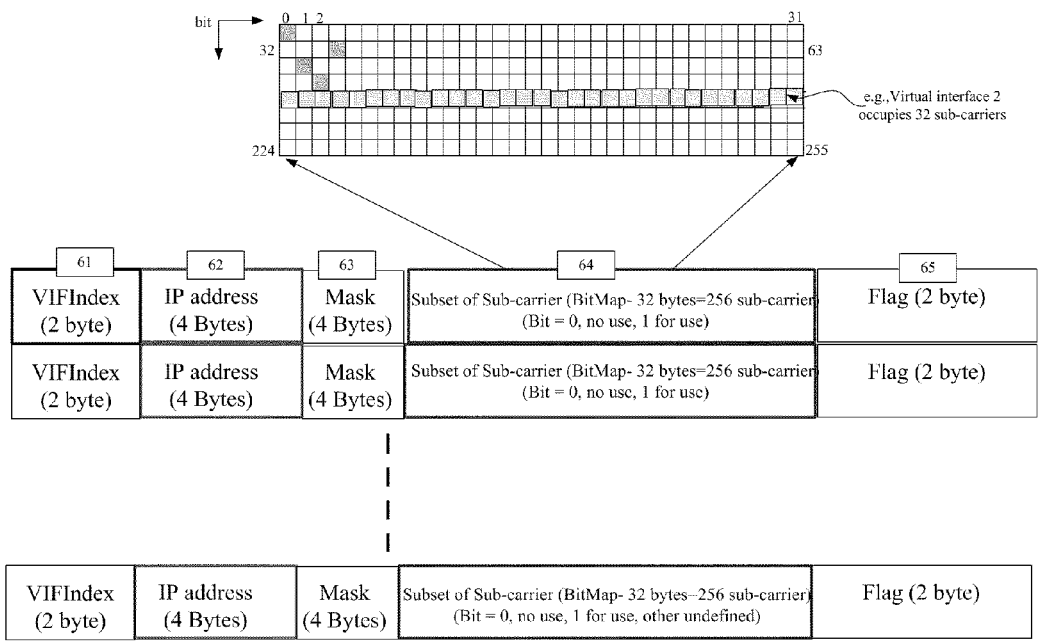
FIG. 6 shows an exemplary mapping structure of virtual interfaces to sub-carriers for optical OFDMA transmission.

As an example, FIG. 2 shows a 6-node sliceable router with networks 21, 22, 23, 24, 25, and 26. The slice or virtual network with nodes 20, 27 and 28 is a user experimental network. Each optical OFDMA physical link supports parallel multiple bandwidth programmable virtual links 29. Each virtual interface with different IP address works as one physical transmission pipe. The router of FIG. 6 provides a guaranteed bandwidth for each virtual link, and can be changed in real-time manner through signaling or routing protocols. The system of FIG. 2 also provides a reconfigurable virtual link (bandwidth and topology reconfiguration-on-demand in real-time manner).

The virtual interface and virtual link shown in FIGS. 1 and 2 are different from the solutions provided by conventional IP/MPLS hardware router or software router, i.e., the Labeled Switched Path (LSP)/Tunnel solutions for virtual link in conventional routers. The conventional tunnel or LSP with higher overhead could not guarantee the bandwidth for virtual link even though those complicated WRR or WFQ scheduling algorithms deployed.

Figure 3:
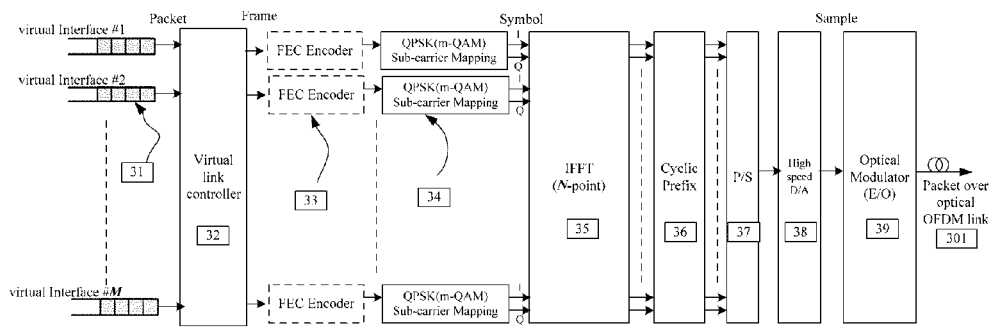
FIG. 3 shows an exemplary packet over optical OFDMA interface transmitter.
Figure 4:
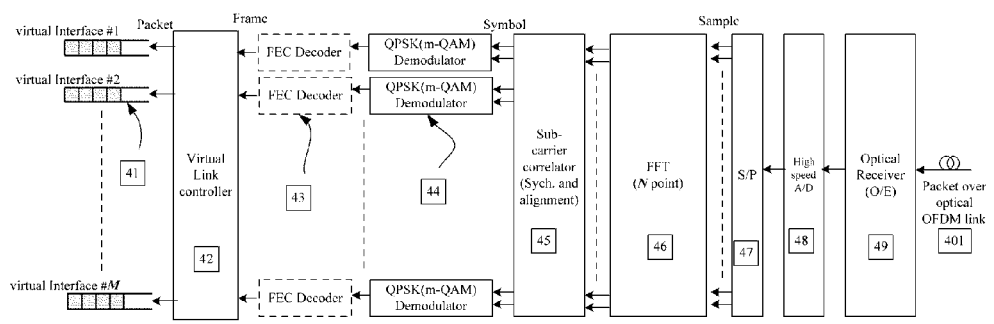
FIG. 4 shows an exemplary packet over optical OFDMA interface receiver.

FIG. 3 presents an exemplary embodiment of the packet over optical OFDM interface transmitter exemplified by blocks 10, 11 and 12 of FIG. 1, while FIG. 4 shows an exemplary receiver structure. In FIG. 3, a plurality of M virtual interfaces 31 receive incoming data packets and provide the data to a virtual link controller 32. The virtual interfaces 31 can be a FIFO buffer, for example. A plurality of encoders 33 such as Forward Error Correction (FEC) encoders are connected to the virtual link controller 32. Each encoder 33 drives a sub-carrier mapping unit 34 such as a quadrature phase-shift keying (QPSK) multilevel quadrature amplitude modulation (mQAM) sub-carrier mapping circuit. The output of the sub-carrier mapping unit 34 is provided to a time to frequency domain converter 35 coupled to the sub-carrier mapping unit which is an Inverse discrete Fourier transform (IFFT) in one embodiment. Next, the data is provided to a cyclic prefix unit 36 from the time to frequency domain converter 35 to provide symbol gap. The output is then provided to an optical transmitter coupled to the cyclic prefix unit. The optical transmitter includes a parallel to serial converter 37 to convert parallel data into serial data; a digital to analog converter (DAC) 38 connected to the parallel to serial converter; and an optical modulator 39. The resulting data packet is provide to an optical OFDMA link 301.

FIG. 4 shows an exemplary OFDMA receiver that works with the transmitter of FIG. 3. The receiver includes an optical receiver to receive data packets from an optical OFDMA link 401. The packets are provided to a frequency to time domain converter 46 such as an FFT unit. A sub-carrier mapping unit 45 receives the output of the frequency to time domain converter 46 to provide synchronization and alignment of the data. A plurality of QPSK demodulators 44 are connected to the sub-carrier mapping unit 45, each demodulator 44 in turn is connected to an FEC decoder 43. The outputs of the decoders 43 are provided to a virtual link controller 42. Virtual interfaces 41 receive the output from the virtual link controller 42. The optical receiver in turn includes a receiver 49 that is connected to the OFDM link 401. An analog to digital converter 48 is connected to the receiver; and a serial to parallel converter 47 converts serial data into parallel data for use by the FFT unit.

Viewing FIGS. 3 and 4 together, in one implementation, a plurality of packets are forwarded from/to FIFO buffer 31 or 41 by the FE 13. The packets are received by the virtual link level controller 32 or 42, which are responsible for virtual link diagnosis (e.g., up/down) and packets encapsulation. The systems of FIGS. 3 and 4 then apply a line coding scheme through FEC encoder/decoder 33 or 43, each of which improves the bit error ratio performance for each virtual link. The packet over OFDM transmission may support M virtual interfaces (VIF), each VIF is isolated by a dedicated subset of sub-carriers (w/different kinds of modulation/code format, e.g., QPSK/QAM 34 or 44. The sub-carrier mapping/demapping unit 34 or 44 is responsible for the mapping/demapping of sub-carriers/virtual interface. An IFFT/FFT (N sub-carrier) unit 35 or 46 is responsible converting the symbol from time domain/frequency domain to frequency domain/time domain. Next, a cyclic prefix (CP) module 36 is added after IFFT operation for handling symbol gaps. A sub-carrier correlator 45 is used for channel synchronization and alignment.

The optical OFDMA transmitter and receiver of FIGS. 3-4 are different from conventional GE and POS transmitter/receivers that are mainly based on TDM/TDMA. POS/GE transmitter/receiver does not support virtual interfaces in the link level.

Figure 5:
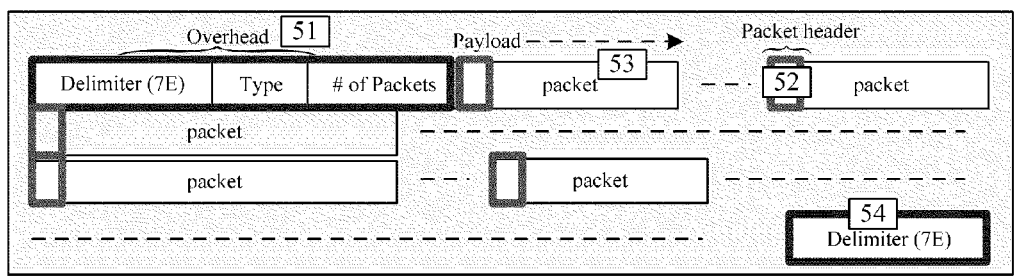
FIG. 5 shows an exemplary link level data frame structure for packet over optical OFDMA transmission.

FIG. 5 is the link level data frame structure of packet over optical OFDMA transmission interface. In this embodiment, the virtual link controller 32 or 42 is responsible for encapsulating multiple packets in one data frame as well as link maintenance. The fields 51 include fields showing a delimiter (0x7E), a type indicator (what kind of packets), and the number of packets 52 encapsulated in the frame and the content field 53. The data frame ends with a delimiter field 54. The data frame structure is lower overhead, simple and straightforward. The packet format includes two fields: packet header 52 and content 53.

Although FIG. 5 shows one format, the packet format could be arbitrary and not limited to current IP packet format.

FIG. 6 shows one exemplary mapping structure of virtual interfaces to sub-carriers for packet over optical OFDMA transmission interface. The adaptive mapping scheme for the virtual interface to transparent subset of sub-carriers shown in FIG. 6 is different from conventional address resolution protocol (ARP) (e.g., GE interface) or fixed mapped structure in a PPP pipe (e.g., POS interface). In this structure, each entry is maintained locally by the sliceable router. A virtual interface (VIF) index 61 identifies the virtual interface ID and the associated FIFO ID. Each virtual interface is configured as an IP address (62) with a mask (63). In one embodiment, they are each 4 bytes long. A bit map structure 64 is used for the mapping of sub-carrier to virtual interfaces. In one implementation, a bit map of 0 means this sub-carrier is not used for this virtual interface, while a bit map value of 1 means that the sub-carrier is used for this virtual interface. The number of sub-carriers N is configured in advance. A flag 65 is provided for future use or other policies configuration.

Figure 7:
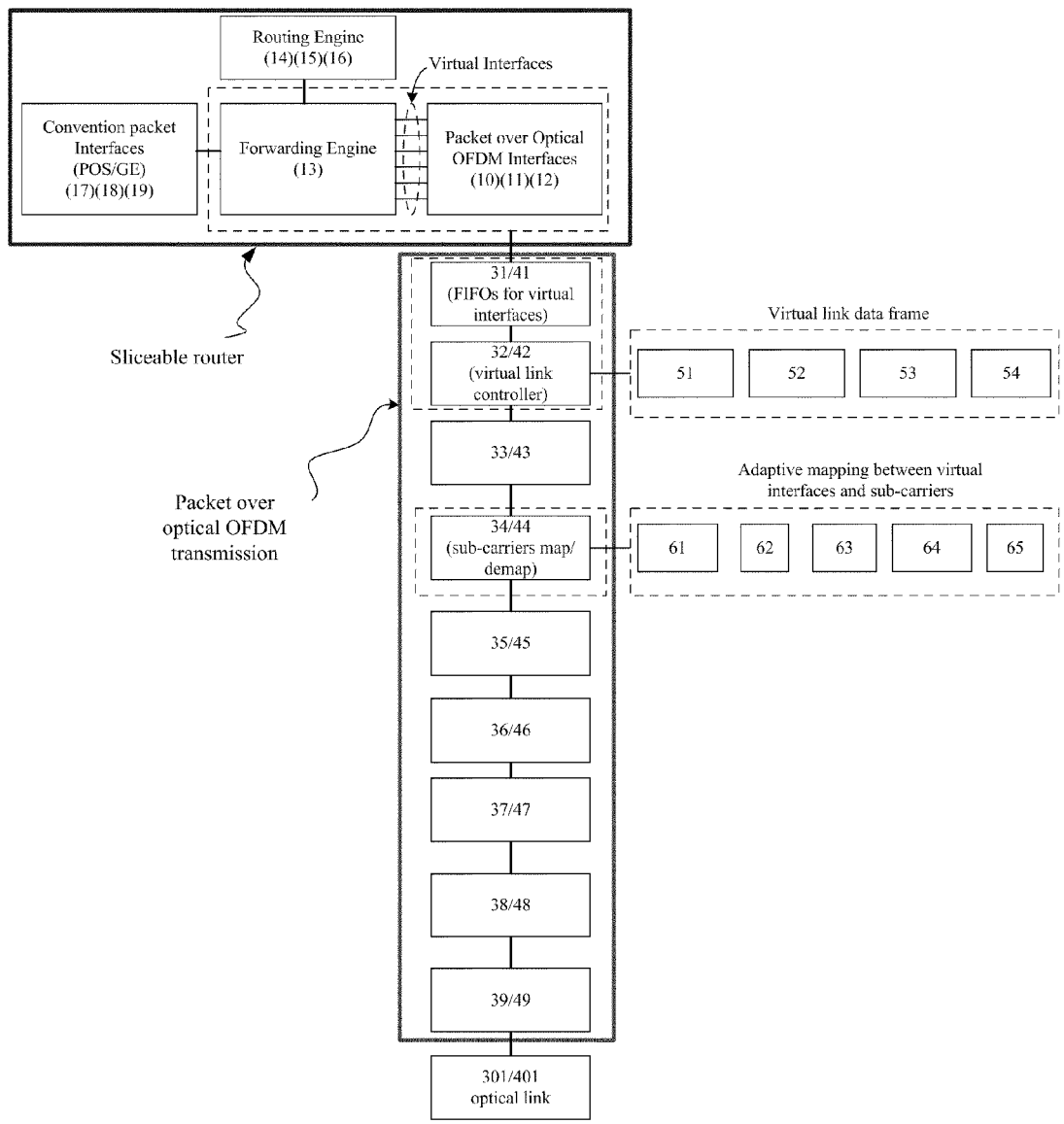
FIG. 7 shows an optical OFDMA virtual interface system.

FIG. 7 shows another view of the optical OFDMA virtual interface system of FIGS. 1-6. In FIG. 7, the FE 13 receives data from conventional packet interfaces such as POS/GE interfaces in blocks 17-19 of FIG. 1. The FE 13 can forward packets over the routing engine formed with blocks 14-16. The FE 13 also receives data from virtual interfaces delivered as packets over the optical OFDMA interfaces through blocks 10-12. The optical OFDMA interfaces in turn receives and transmits data over queues such as incoming FIFOs 31 and outgoing FIFOs 41. The virtual link controllers 32 and 42 handle the virtual link data frame with fields 51-54. The sub-carrier mapping unit 34 and demapping unit 44 adaptively maps data between virtual interfaces and sub-carrier signals.

The resulting packet over optical OFDMA transmission provides a high-speed multi-carrier transmission technique where data bits are encoded to multiple sub-carriers and sent simultaneously in time, which result in an optimum usage of router transmission bandwidth. Compared against conventional IP/MPLS hardware router or software router, the sliceable router architecture shown in FIG. 1 utilizes optical OFDMA transmission technique and provides a method in the link level to support virtual interfaces via transparent subset of sub-carriers and adaptive mapping scheme. Compared to Label switching path (LSP)/Tunnel solutions for providing virtual links in conventional routers, the transceiver structure and mapping schemes of FIGS. 3-6 guarantee flexible/programmable bandwidth management/sharing schemes for different slices, it also has lower overhead as well as higher spectral efficiency for transmission. In additional to the slice provisioning, the virtualization method is also ideal for broadband multimedia applications such as HDTV transmission, HD Video, IPTV applications, RoF applications, and mobile backhaul applications, among others.

The invention may be implemented in hardware, firmware or software, or a combination of the three. The computer includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A sliceable router, comprising:
   a. a forwarding engine to forward packets based on a plurality of virtual packet interfaces;
   b. control packet queues coupled to the forwarding engine;
   c. a routing engine coupled to the forwarding engine that disseminates each virtual interface routing information independently and simultaneously;
   d. wherein the virtual interfaces share an optical orthogonal frequency-division multiple access (OOFDMA)-based programmable transceiver for interface virtualization, wherein each virtual packet interface with different IP address works as one physical transmission pipe and wherein the routing engine provides a guaranteed bandwidth for each virtual link, and changeable in real-time manner through signaling or routing protocols and wherein the routing engine splits one high-speed optical link into multiple low-speed virtual links in a router for the purpose of bandwidth virtualization (bandwidth sliceable); and
   e. one or more conventional physical packet interfaces coupled to the forwarding engine;
   f. a virtual link controller coupled to the virtual packet interfaces;
   g. a plurality of encoders coupled to the virtual link controller, each encoder coupled to a sub-carrier mapping unit for mapping the virtual packet interfaces to sub-carriers in OOFDMA transmission;
   h. a plurality of decoders coupled to the virtual link controller, each decoder coupled to a sub-carrier demapping (demodulator) unit for demapping sub-carriers to the virtual packet interfaces in OOFDMA transmission;
   i. an OOFDMA transmitter coupled to the sub-carrier mapping unit; and
   j. an OOFDMA receiver coupled to the sub-carrier demapping unit (demodulator).

2. The sliceable router of claim 1, wherein the virtual packet interface comprises a router-packet over optical OFDMA transmission technique.

3. The sliceable router of claim 1, wherein the virtual packet interface supports M virtual interfaces with N sub-carriers in one optical OFDMA physical link.

4. The sliceable router of claim 1, comprising a packet over optical OFDMA interface transmitter.

5. The sliceable router of claim 1, wherein each sub-carrier mapping unit comprises a programmable modulation formats mapping unit.

6. The sliceable router of claim 4, comprising an OOFDMA transmitter including:
   a frequency-to-time domain converter (IFFT);
   a cyclic prefix unit coupled to the frequency-to-time domain converter to provide symbol gap;
   a parallel to serial converter (P/S) to convert parallel data into serial data;
   a digital to analog converter (D/A) coupled to the parallel to serial converter; and
   an optical modulator coupled to the D/A.

7. The sliceable router of claim 1, comprising a packet over optical OFDMA interface receiver.

8. The sliceable router of claim 7, comprising an OOFDMA receiver coupled to the OFDMA, including:
   a. a optical receiver for optical to electrical (O/E) conversion coupled to an OFDMA link;
   b. an analog to digital converter (A/D) coupled to the optical receiver;
   c. serial to parallel converter (S/P) to convert serial data into parallel data.
   d. a time to frequency domain converter (FFT) coupled to serial to parallel converter (S/P);
   e. a sub-carrier correlator unit coupled to the time to frequency domain converter (FFT);
   f. a plurality of demodulators (i.e., sub-carrier demapping unit) coupled to the sub-carrier correlator unit.

9. The sliceable router of claim 7, comprising:
   b. an optical receiver for optical to electrical (0/E) conversion coupled to an OFDMA link;
   c. a time to frequency domain converter (FFT) coupled to serial to parallel converter (S/P);
   d. a frequency to time domain converter (FFT) coupled to the optical receiver;
   e. a sub-carrier correlator unit coupled to the time to frequency domain converter (FFT);
   f. a plurality of demodulators coupled to the sub-carrier correlator unit and
   g. a virtual link controller coupled to the decoders; and
   h. a plurality of virtual interfaces coupled to the virtual link controller.

10. The sliceable router of claim 1, wherein each decoder comprises an FEC decoder.

11. The sliceable router of claim 1, wherein each sub-carrier demapping unit comprises a demodulator.

12. The sliceable router of claim 1, wherein the OOFDMA-based programmable transceiver uses an adaptive link level to support multiple packet encapsulations.

13. The sliceable router of claim 1, wherein the packets comprise IP packets or non-IP packets.

14. The sliceable router of claim 1, wherein the packets comprises jumbo packets.

15. The sliceable router of claim 1, comprising an adaptive mapping structure of virtual interfaces to sub-carriers for packet over optical OFDMA transmission interface.

16. The sliceable router of claim 14, wherein each entry is maintained locally by the sliceable router.

17. The sliceable router of claim 14, comprising a virtual interface index providing the virtual interface identification and the associated FIFO identification.

18. The sliceable router of claim 14, wherein each virtual interface is configured as an IP address with a mask.

19. The sliceable router of claim 1, wherein the packet over optical OFDMA transceiver is combined with a wavelength switching unit for providing multi-granularity dynamic circuit switching.

20. The sliceable router of claim 1, wherein the physical packet over optical OFDMA interface is sliceable for dynamically mapping packet flows onto the sub-carriers of optical orthogonal frequency-division multiplexing transmission.

21. The sliceable router of claim 1, wherein each virtual interface within a physical optical OFDMA transmission interface forms a bandwidth-variable virtual link with the adjacent sliceable router.

* * * * *